United States Patent
Sun et al.

(10) Patent No.: US 9,602,161 B2
(45) Date of Patent: Mar. 21, 2017

(54) SCALED POWER LINE BASED NETWORK

(71) Applicant: Texas Instruments Incorporated, Dallas, TX (US)

(72) Inventors: Yanjun Sun, San Diego, CA (US); Minghua Fu, Plano, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/688,526

(22) Filed: Apr. 16, 2015

(65) Prior Publication Data

US 2015/0222327 A1    Aug. 6, 2015

Related U.S. Application Data

(62) Division of application No. 13/677,418, filed on Nov. 15, 2012.

(60) Provisional application No. 61/560,112, filed on Nov. 15, 2011.

(51) Int. Cl.
*H04B 3/56* (2006.01)
*H04B 3/54* (2006.01)

(52) U.S. Cl.
CPC ............... *H04B 3/56* (2013.01); *H04B 3/54* (2013.01)

(58) Field of Classification Search
USPC .................................................. 375/257, 220
See application file for complete search history.

(56) References Cited

U.S. PATENT DOCUMENTS

| | | | | |
|---|---|---|---|---|
| 4,066,912 A | * | 1/1978 | Wetherell | ......................... 307/3 |
| 8,536,985 B1 | * | 9/2013 | Wedding et al. | .......... 340/12.34 |
| 2007/0201540 A1 | * | 8/2007 | Berkman | ..................... 375/219 |

OTHER PUBLICATIONS

Yan Ming et al., The Design and Implementation of 128-bit AES encryption in PRIME, 2010, IEEE, vol. 7, pertinent pp. 345-348.*

* cited by examiner

*Primary Examiner* — Kabir A Timory
(74) *Attorney, Agent, or Firm* — Kenneth Liu; Charles A. Brill; Frank D. Cimino

(57) ABSTRACT

A power line communication (PLC) network includes a plurality of PLC devices. One such PLC device may include a transmitter power control system that determines a minimum level of transmission power for sufficiently communicating a plurality of data packets from the PLC device over the PLC network to a first destination PLC device on the PLC network by executing a training sequence over the PLC network via an electrical power distribution system. The transmitter power control system applies this minimum level of transmission power to transmit the data packets to the first destination PLC device.

10 Claims, 2 Drawing Sheets

SCALED POWER LINE BASED NETWORK

CROSS-REFERENCE TO RELATED APPLICATION

The present application is a Divisional of and claims priority to U.S. patent application Ser. No. 13/677,418, filed Nov. 15, 2012, which claims priority to U.S. Provisional Patent Application No. 61/560,112, filed on Nov. 15, 2011 which is hereby incorporated herein by reference in its entirety.

BACKGROUND

Power line networking, also known as power line communication (PLC), employs the conductors of the electrical power distribution system as a medium for data communication. Power line networking is cost effective because wiring for power distribution is necessarily installed in both residential and commercial structures, providing a ready medium for data communication at little or no additional cost. As standards (e.g. PRIME, G3, IEEE 1901.2) and technologies for power line networking proliferate, devices increasingly incorporate PLC transceivers for use in applications such as smart metering, smart building, and home/industry automation. A large number of devices, including various appliances, sensors and controllers, can be connected to the power line network of a building, and the number of devices connected to power line networks is increasing for applications such as home automation, health care, solar/thermal power management, electric vehicles, etc.

SUMMARY

Systems and methods for scaling a power line communication network are disclosed herein. In one embodiment, a power line communication network includes a first power line communication sub-network, a second power line communication sub-network, and an isolation filter disposed between the first and second power line communication sub-networks. The isolation filter is configured to pass electrical power signals between the first and second power line communication sub-networks, and to block passage of data communication signals from the first power line communication sub-network to the second power line communication sub-network.

In another embodiment, a power line communication network includes a plurality of devices configured to communicate over conductors of an electrical power distribution system via a plurality of non-interfering channels. Different ones of the devices are configured to communicate via different ones of the non-interfering channels.

In a further embodiment, a power line communication network includes a first device configured to communicate via conductors of an electrical power distribution system. The first device includes a transmitter power control system configured to determine transmission power needed to communicate with a second device of the power line communication network. The determined transmission power is insufficient to communicate with a third device of the power line communication network, and the transmitter power control system is configured to determine transmission power needed to communicate with the third device.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
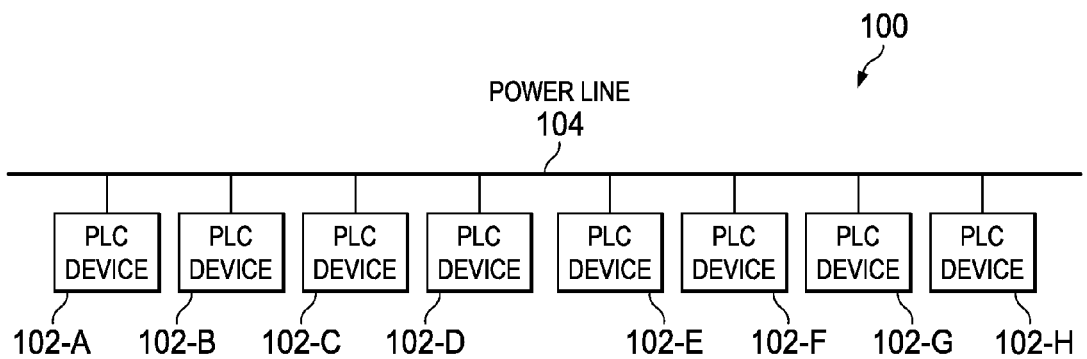
FIG. 1 shows a block diagram of an illustrative power line network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional power line networks lack scalability due to the characteristics of the power line medium and the applied Medium Access Control (MAC) protocols. The MAC protocols of the power line communication (PLC) standards (PRIME, G3, IEEE 1901.2) are similar to those of the IEEE 802.15.4 standard because of the similarities of signal propagation between a wireless medium and a power line. When a signal representing a packet is driven onto a power line, similar to packet transmission over the air, the signal strength decreases with distance. Consequently, power line networks face scalability issues similar to those of IEEE 802.15.4 based networks. As the number of devices in a power line network increases, the gap between achievable network throughput and network capacity quickly increases. For example, in a power line network including thirty devices, the achievable throughput may be only 10% of the network capacity. Such low throughput is caused in part by the medium time that is wasted to resolve contentions between multiple transmitting devices.

Performance degradation in power line networks can be even greater than that of wireless networks because in a power line network the signal is constrained in the power line instead of omnidirectionally dissipated in the air. Thus, a power line network transmitter tends to have better reachability than a RF transmitter with the same transmission power. With the same network device density, better reachability allows more devices in the network and in turn results in lower achievable network throughput.

Embodiments of the present disclosure apply various novel techniques to reduce the contention level in a power line network and to increase network performance. Embodiments may physically and/or logically subdivide a power line network into smaller sections thereby reducing the contention level and improving the throughput of each section and the network as a whole. Furthermore, because devices on the network receive fewer irrelevant packets, embodiments also improve network power efficiency.

FIG. 1 shows a block diagram of an illustrative power line network 100 in accordance with various embodiments. The power line network 100 includes a power line 104 which serves as the medium for communication transfer. The power line 104 may include electrical power wiring that transfers electrical power within a residential or commercial structure, and/or power conductors used to transfer electrical power to or external to a structure. PLC devices 102A-H (collectively "devices 102") are coupled to the power line 104. The PLC devices 102 are configured to communicate with one another by transferring information via the power line 104. Each of the PLC devices 102 may provide different functionality and communicate information related to that functionality via the power line 104. For example, a PLC device 102 may be a temperature sensor, a humidity sensor, a light sensor, a motion sensor, an electrical power meter, a television, an air conditioning unit, a washer, a refrigerator, a controller, or any other device configured to communicate via the power line 104.

Figure 2:
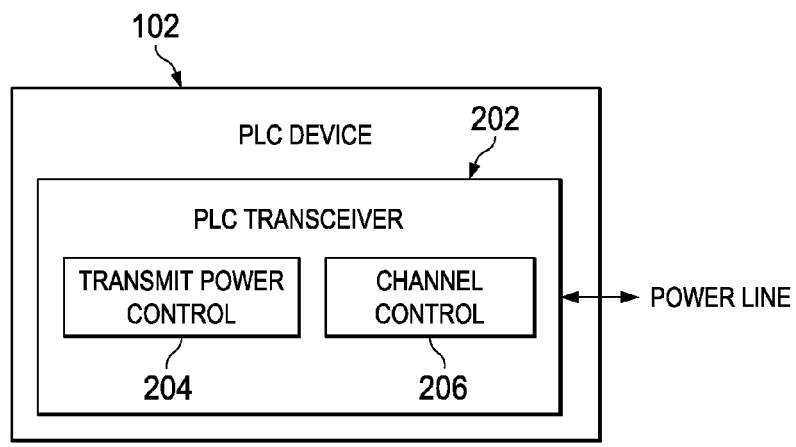
FIG. 2 shows a block diagram of a device configured to access a power line network in accordance with various embodiments.

The PLC devices 102 are configured to reduce collisions on the power line 104 by reducing the number of transmissions detected by all the devices 102 connected to the power line 104. FIG. 2 shows a block diagram of a PLC device 102. The PLC device 102 includes a PLC transceiver 202 that transmits and receives communication signals, such as data packets, via the power line 104. Embodiments of the transceiver 202 include transmit power control logic 204 and/or channel control logic 206.

The transmit power control logic 204 determines how much transmission power should be applied to successfully transmit data to a destination PLC device 102 via the power line 104. The transmit power control logic 204 may attempt to determine the minimum transmission power needed for the destination PLC device 102 to receive a data transmission. After determination of the minimum transmission power the transmit power control logic 204 may set the transmission power to the determined level for each transmission to the destination PLC device 102. The transmit power control logic 204 202 may determine and apply a different power level for each destination PLC device 102 because a destination PLC device 102 farther from the transceiver 202 may require a higher transmission power than a destination PLC device 102 closer to the transceiver 202. By minimizing transmission power for each destination PLC device 102, the transmit power control logic 204 reduces the number of collisions on the power line 104 by reducing the number of transmissions detected by all PLC devices 102 connected to the power line 104.

Figure 3:
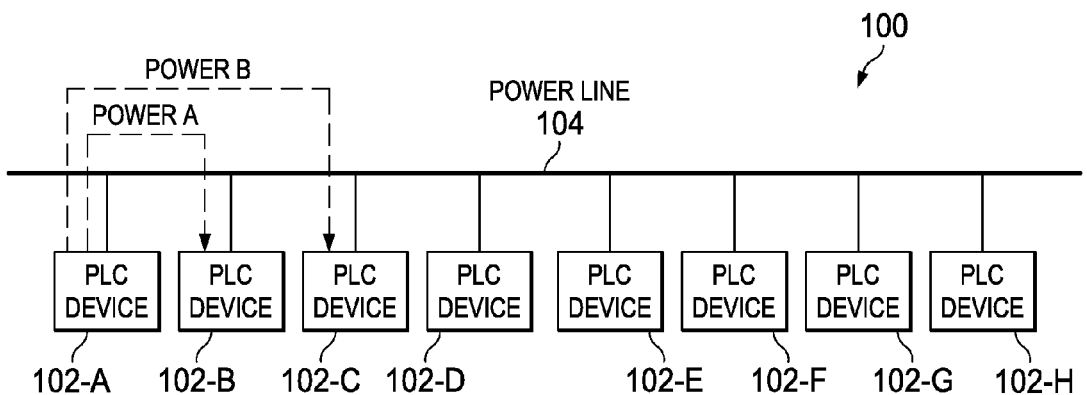
FIG. 3 shows a block diagram of a power line network including transmission power control to reduce contention in accordance with various embodiments.

FIG. 3 shows a block diagram of the power line network 100 illustrating the use of transmission power control to reduce contention in accordance with various embodiments. In FIG. 3, PLC device 102-A includes transmission power control logic 204. The transmission power control logic 204 has determined a first transmission power level (POWER A) for communicating with PLC device 102-B, and a second transmission power level (POWER B) for communicating with PLC device 102-C. POWER B may be greater that POWER A if communication with PLC device 102-C requires higher transmission power than communication with PLC device 102-B (e.g., PLC device 102-C is more distant from PLC device 102-A than is PLC device 102-B). Because POWER A is tailored to minimize the power used to communicate with PLC device 102-B, transmissions from PLC device 102-A to PLC device 102-B may not be detected by at least some of PLC devices 102 C-H. Similarly, because POWER B is tailored to minimize the power used to communicate with PLC device 102-C, transmissions from PLC device 102-A to PLC device 102-C may not be detected by at least some of PLC devices 102 D-H.

Embodiments of the transmission power control logic 204 may determine a minimum level of power needed to communicate with a destination PLC device 102 by executing a training sequence. The training sequence may include a bi-directional exchange of information between the source PLC device 102 and the destination PLC device 102. For example, the transmission power control logic 204 may transmit to the destination PLC device 102 with successively reduced transmission power until the destination PLC device 102 no longer acknowledges receipt of the transmission, until the destination device acknowledges receipt with a predetermined minimum received signal power, etc. Alternatively, the destination PLC device 102 may provide other information that indicates the minimum level of power to be applied by the transmission power control logic 204 for communication with the destination PLC device 102.

Returning now to FIG. 2, the channel control logic 206 determines which of a plurality of channels is to be used to communicate with a destination PLC device 102. Various PLC standards (e.g., PRIME, G3, IEEE 1901.2) have defined different bands for power line network communication. In each band, multiple orthogonal sub-channels may be defined. Because transmissions over the orthogonal channels don't interfere with each other and not all of the PLC devices 102 need to communicate with each other, a first set of devices 102 that needs to communicate may be assigned to a first channel, and a second set of devices assigned to a second channel, etc. By reducing the number of devices 102 communicating on a common channel, embodiments reduce the number of collisions on the power line 104 and increase the overall throughput of the power line network 100.

The channel control logic 206 may also be configured to allow the PLC device 102 to communicate via more than one channel. Such a PLC device 102 may serve as bridge and pass communication from a PLC device 102 utilizing a first channel to a PLC device 102 utilizing a second channel.

Figure 4:
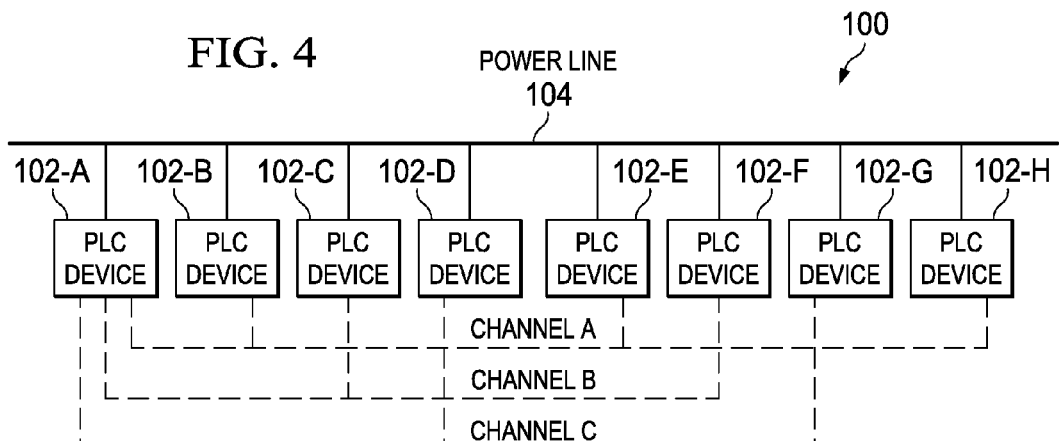
FIG. 4 shows a block diagram of a power line network that applies a plurality of channels to reduce contention in accordance with various embodiments.

FIG. 4 shows a block diagram of a power line network 100 that applies a plurality of channels to reduce contention in accordance with various embodiments. In FIG. 4, the PLC devices 102 are configured to communicate via the power line 104 using channels A, B, and C. PLC devices 102-B, E, and H are configured to communicate using channel A. PLC devices 102-C and F are configured to communicate using channel B. PLC devices 102-D and G are configured to communicate using channel C. PLC device 102-A is configured to communicate using channels A, B, and C, and thus can serve as a bridge between the PLC devices 102 exclusively using one of channels A-C.

Figure 5:
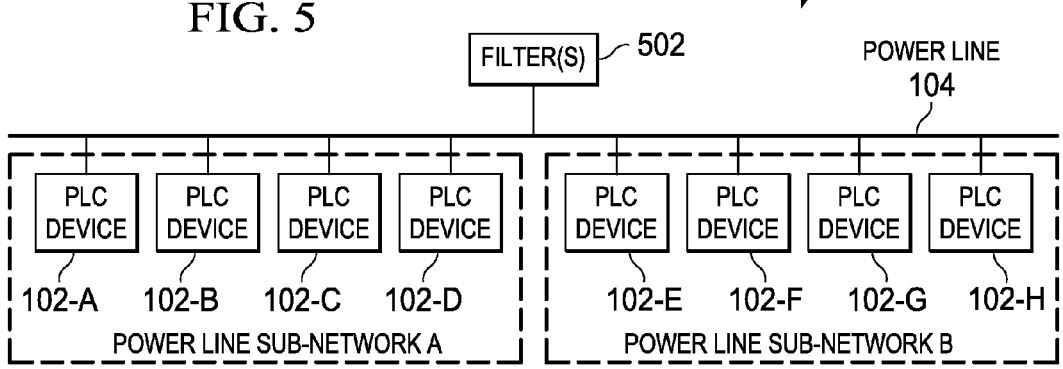
FIG. 5 shows a block diagram of a power line network that includes a filter that sub-divides the network into sub-networks in accordance with various embodiments.

FIG. 5 shows a block diagram of a power line network 500 that includes a filter 502 that sub-divides the network 500 into sub-networks in accordance with various embodiments. The filter circuit 502 blocks the propagation of a PLC signals between the sub-networks. PLC signals have much higher frequency than the 50/60 Hz AC power. Accordingly, the filter 502 can include circuitry that filters or blocks the PLC signal without affecting AC power propagation. Some embodiments of the filter circuit 502 include one or more capacitors and/or other components, such as transformers, inductors, etc., that remove or largely attenuate the PLC signals from both sides of the filter circuit 502 while passing AC power signals. In some embodiments, filter circuit 502 may include a transformer that electrically isolates the sub-networks. With the isolation provided by the filter 502, transmissions originating on one side of the filter circuit 502 have little or no effect on transmissions originating on the other side of the filter circuit 502, which reduces the network contention level and improves parallelism and throughput. For example, the PLC devices 102 of power line sub-network A and the PLC devices 102 of the power line sub-network B can communicate concurrently with without interfering with one another.

Some embodiments of the filter 502 are configured to pass PLC signals on some channels (e.g., some frequency bands), thereby enabling communication between selected devices in different sub-networks. Embodiments can also use out-of-band communication such as RF to communicate between sub-networks. For example, devices 102-A and 102-H may include RF transceivers that allow communication between the sub-networks.

The power line network scaling techniques disclosed herein also improve network energy efficiency. Packets blocked by the filter 502, transmitted on one of a plurality of channels, or with reduced transmit power are not detected by all the devices 102 of the network. Consequently, not all the devices 102 consume energy to decode the irrelevant packets and can spend more time in a low power state. Embodiments additionally provide isolation (e.g., via channels or filtering) that improves network security. For example, the filter 502 limits the range of signal propagation, thereby avoiding undesired information leakage.

Embodiments of the transmit power control logic 204, the channel control logic 206, and other portions of the PLC device 102 may include hardware resources, or hardware and software resources (i.e., instructions) to perform the functions disclosed herein. For example, some embodiments may be implemented as one or more processors executing instructions retrieved from a computer-readable storage medium. Processors suitable for implementing the PLC device 102 or portions thereof may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions may include volatile storage such as random access memory, non-volatile storage (e.g., a hard drive, an optical storage device (e.g., CD or DVD), FLASH storage, read-only-memory), or combinations thereof.

Some embodiments of the transmit power control logic 204, the channel control logic 206, and other portions of the PLC device 102 may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 6:
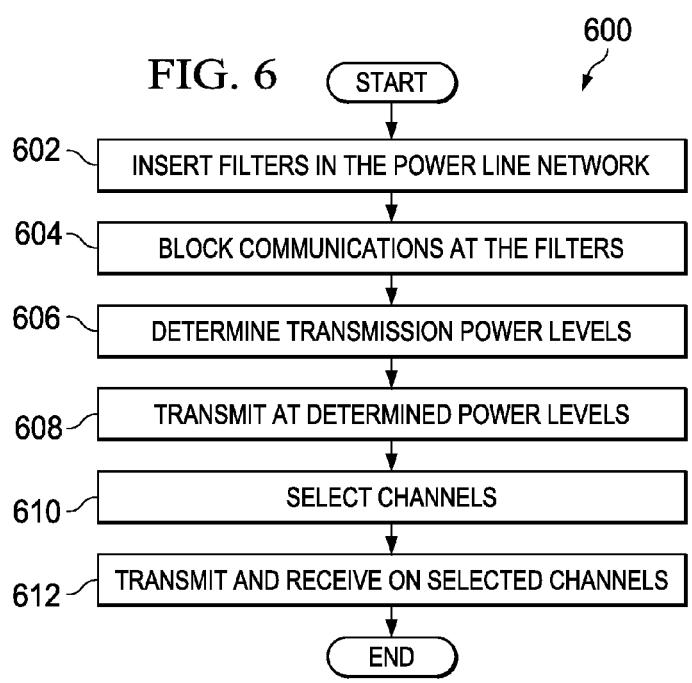
FIG. 6 shows a flow diagram for a method for scaling a power line network in accordance with various embodiments.

FIG. 6 shows a flow diagram for a method 600 for scaling a power line network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by a processor executing instructions stored in a computer readable medium.

In block 602, one or more filters 502 are inserted in the power line network 100. The filter 502 is a band stop filter that blocks passage of transmissions in one or more frequency bands, thereby partitioning the network 100 into a plurality of sub-networks. In block 604, a PLC device 102 in one sub-network transmits a packet and the filter 502 blocks the transmission so that the PLC devices 102 of another sub-network do not detect the transmission. As a result, the number of PLC devices 102 in the network 100 detecting a transmission and the number of collisions on the network 100 is reduced.

In block 606, each PLC device 102 determines a transmission power to apply when transmitting to each other PLC device 102. The transmission power determined for transmitting to a given other PLC device 102 may be a minimum transmission power detectable by the given other PLC device 102 and undetectable by other PLC devices 102. Each PLC device 102 may execute a training sequence, in conjunction with each other PLC device 102, to determine the minimum transmission power to be applied by the PLC device 102 when transmitting to the other PLC device 102. For example, a transmitting PLC device 102 may successively transmit to a destination PLC device 102, and the destination PLC device 102 may return acknowledgement and/or a power measurement value to the transmitting PLC device 102 until the minimum transmission power detectable by the destination PLC device 102 is determined.

In block 608, a PLC device 102 transmits to a destination PLC device 102 using the minimum determined power level for the destination PLC device 102. Because the transmitting PLC device 102 applies the minimum determined power level for communicating with the destination PLC device 102, other PLC devices 102 in the power line network 100 do not detect the transmission. Consequently, the number of collisions on the network 100 is reduced.

In block 610, each PLC device 102 in the power line network 102 determines or is assigned one or more channels (e.g., frequency bands) on which to communicate. The channels may be non-overlapping so that transmissions on different channels do not interfere with one another. Some PLC devices 102 may be assigned a single channel, and other PLC devices 102 may be assigned multiple channels.

A PLC device 102 assigned to communicate via multiple channels may serve as a bridge for communication between devices 102 assigned to different channels. In block 612, the PLC devices 102 transmit and receive via the assigned channels.

Fewer than all the PLC devices 102 in power line network 100 are assigned to the same channel. Consequently, the number of PLC devices 102 detecting a transmission and the number of collisions on the network 100 is reduced.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power line communication (PLC) device comprising:
   a transmitter power control system configured to determine a first level of transmission power for communicating a plurality of data packets from the PLC device over a PLC network to a first destination PLC device on the PLC network by executing a training sequence over the PLC network via an electrical power distribution system and to apply the first level of transmission power to transmit the data packets to the first destination PLC device;
   wherein the first level of transmission power enables the PLC device to transmit the data packets to the first destination PLC device, but not to a second destination PLC device on the PLC network, and wherein executing the training sequence comprises:
      repeatedly transmitting from the PLC device to the first destination PLC device using successively reduced transmission power levels until the first destination PLC acknowledges receipt with a predetermined level of received signal power; and
      selecting the transmission power level that resulted in the first destination PLC device acknowledging receipt with the predetermined level of received signal power as the first level of transmission power.

2. The PLC device of claim 1, wherein the PLC network is a PoweRline Intelligent Metering Evolution (PRIME) network.

3. The PLC device of claim 1, wherein the PLC network is a G3 network.

4. The PLC device of claim 1, wherein the PLC network is an Institute of Electrical and Electronics Engineers (IEEE) P1901.2 network.

5. The PLC device of claim 1, wherein the distance between the PLC device and the second destination PLC device is greater than the distance between the PLC device and the first destination PLC device.

6. The PLC device of claim 5, wherein the first level of transmission power is insufficient for transmitting the data packets from the PLC device over the distance between the PLC device and the second destination PLC device.

7. The PLC device of claim 5, wherein the transmitter power control system is configured to determine, via the training sequence, a second level of transmission power that enables the PLC device to transmit the plurality of data packets from the PLC device to the second destination PLC device.

8. The PLC device of claim 7, further comprising channel control logic configured to assign, from a plurality of available channels, a first channel for communicating from the PLC device to the first destination PLC device and a second channel for communicating from the PLC device to the second destination PLC device.

9. The PLC device of claim 8, wherein the first channel and the second channel are non-interfering with one another.

10. A power line communication (PLC) device comprising:
    a transmitter power control system configured to determine a first level of transmission power for communicating a plurality of data packets from the PLC device over a PLC network to a first destination PLC device on the PLC network by executing a training sequence over the PLC network via an electrical power distribution system and to apply the first level of transmission power to transmit the data packets to the first destination PLC device;
    wherein the first level of transmission power enables the PLC device to transmit the data packets to the first destination PLC device, but not to a second destination PLC device on the PLC network, and wherein executing the training sequence comprises:
    repeatedly transmitting from the PLC device to the first destination PLC device using successively reduced transmission power levels until the first destination PLC device no longer acknowledges receipt of the transmission; and
    selecting the lowest transmission power level that resulted in the first destination PLC device acknowledging receipt of the transmission as the first level of transmission power.

* * * * *